United States Patent
Tempelmann et al.

(10) Patent No.: US 11,719,150 B2
(45) Date of Patent: Aug. 8, 2023

(54) METHOD AND A CONTROL ARRANGEMENT FOR A PROCESS OF SELECTIVE CATALYTIC REDUCTION AFTER-TREATMENT OF AN EXHAUST GAS

(71) Applicant: Scania CV AB, Södertälje (SE)

(72) Inventors: David Tempelmann, Älvsjö (SE);
Christer Lundberg, Rönninge (SE);
Tobias Brännvall, Södertälje (SE);
Johan Lundström, Järna (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/802,574

(22) PCT Filed: Feb. 26, 2021

(86) PCT No.: PCT/SE2021/050163
§ 371 (c)(1),
(2) Date: Aug. 26, 2022

(87) PCT Pub. No.: WO2021/177875
PCT Pub. Date: Sep. 10, 2021

(65) Prior Publication Data
US 2023/0143384 A1  May 11, 2023

(30) Foreign Application Priority Data
Mar. 6, 2020   (SE) .................................... 2050257-1

(51) Int. Cl.
*F01N 3/20* (2006.01)

(52) U.S. Cl.
CPC .......... *F01N 3/208* (2013.01); *F01N 2570/14* (2013.01); *F01N 2610/02* (2013.01);
(Continued)

(58) Field of Classification Search
CPC .. F01N 3/208; F01N 2570/14; F01N 2610/02; F01N 2900/0418; F01N 2900/1812; F01N 2900/1821
See application file for complete search history.

(56) References Cited

U.S. PATENT DOCUMENTS 9,021,787 B2   5/2015   Yan et al.
9,284,873 B2   3/2016   Kaemingk et al.
(Continued)

FOREIGN PATENT DOCUMENTS

CN   106837498 B   7/2019
CN   110725737 A   1/2020
(Continued)

OTHER PUBLICATIONS

Scania CV AB, International Patent Application No. PCT/SE2021/050163, International Preliminary Report on Patentability, dated Sep. 6, 2022.
(Continued)

*Primary Examiner* — Brandon D Lee
(74) *Attorney, Agent, or Firm* — Moore & Van Allen PLLC; W. Kevin Ransom (57) ABSTRACT

Disclosed is a method for use in a process of selective catalytic reduction (SCR) after-treatment of an exhaust gas of an exhaust gas stream, where the process comprises the reduction of nitrogen oxides of the exhaust gas stream through the use of a reducing agent derived from an additive. The disclosed method comprises: defining an integrand to be the difference between the rate of injection of the additive and the rate of evaporation of the additive to the reducing agent multiplied by a coefficient (s), wherein the value of the coefficient (s) is between zero and one; producing an integral controller output proportional to the integral of the integrand with time; requesting a countermeasure based on the integral (Continued)

controller output to counteract solid deposits derived from the additive.

14 Claims, 5 Drawing Sheets

(52) U.S. Cl.
CPC ............... *F01N 2900/0418* (2013.01); *F01N 2900/1812* (2013.01); *F01N 2900/1821* (2013.01)

(56) References Cited

U.S. PATENT DOCUMENTS

| | | |
|---|---|---|
| 2013/0028792 A1 | 1/2013 | Yano et al. |
| 2014/0017794 A1 | 1/2014 | Zeng et al. |
| 2015/0143800 A1 | 5/2015 | Simon et al. |
| 2019/0063289 A1* | 2/2019 | Yi ................... B01D 53/9431 |
| 2019/0368400 A1 | 12/2019 | Landwehr et al. |

FOREIGN PATENT DOCUMENTS

| | | |
|---|---|---|
| EP | 1331373 A2 | 7/2003 |
| WO | 2013100846 A1 | 7/2013 |

OTHER PUBLICATIONS

Scania CV AB, International Patent Application No. PCT/SE2021/050163, International Search Report, dated Mar. 12, 2021.

Scania CV AB, International Patent Application No. PCT/SE2021/050163, Written Opinion, dated Mar. 12, 2021.

* cited by examiner

METHOD AND A CONTROL ARRANGEMENT FOR A PROCESS OF SELECTIVE CATALYTIC REDUCTION AFTER-TREATMENT OF AN EXHAUST GAS

CROSS-REFERENCE TO RELATED APPLICATION(S)

This application is a National Stage Patent Application (filed under 35 § U.S.C. 371) of PCT/SE2021/050163, filed Feb. 26, 2021, of the same title, which, in turn claims priority to Swedish Patent Application No. 2050257-1 filed Mar. 6, 2020, of the same title; the contents of each of which are hereby incorporated by reference.

FIELD OF THE INVENTION

Aspects of the present invention relate to a method and a control arrangement for a process of selective catalytic reduction, SCR, after-treatment of an exhaust gas of an exhaust gas stream from a combustion engine.

BACKGROUND OF THE INVENTION

It is known to perform a selective catalytic reduction, SCR, after-treatment of an exhaust gas of an exhaust gas stream from a combustion engine of a motor vehicle. By way of the SCR after-treatment of the exhaust gas, nitrogen oxides of the exhaust gas stream are reduced, which is desired with regard to environmental aspects. In general, an additive in liquid form, such as an aqueous urea solution, may be provided to the exhaust gas stream and evaporated to form a reducing agent, such as ammonia. The ammonia is then used in a reduction catalyst to reduce the nitrogen oxides of the exhaust gas stream to diatomic nitrogen.

The additive in liquid form, such as an aqueous urea solution, which does not evaporate to form the reducing agent, may form undesired solid deposits in an SCR exhaust gas after-treatment system, for example in the evaporation arrangement of the SCR exhaust gas after-treatment system, such as on evaporation surfaces of the evaporation arrangement, on surfaces of a reduction catalyst device of the SCR exhaust gas after-treatment system, or on surfaces of other catalysts included in the exhaust gas after-treatment system. The undesired solid deposits derived from the additive impair the performance of the SCR exhaust gas after-treatment system and may, for example, block the evaporation arrangement of the SCR exhaust gas after-treatment system. If at all possible, the removal of already formed deposits derived from the additive requires an increased consumption of fuel and an increased temperature in the SCR exhaust gas after-treatment system. The solid deposits derived from the additive may even require that parts of the exhaust gas after-treatment system, or the entire exhaust gas after-treatment system, are exchanged. Thus, said solid deposits should be avoided. In general, the additive addition to the exhaust gas stream should not exceed a certain level or certain levels to avoid deposits. This is disclosed in more detail in the detailed description hereinbelow.

SUMMARY OF THE INVENTION

An object of the invention is to provide a solution which mitigates or solves the drawbacks and problems of conventional solutions.

The above and further objects are solved by the subject matter of the independent claims. Further advantageous embodiments of the invention can be found in the dependent claims.

According to a first aspect of the invention, the above mentioned and other objects are achieved with a method for a process of selective catalytic reduction (SCR) after-treatment of an exhaust gas of an exhaust gas stream from a combustion engine, wherein the selective catalytic reduction (SCR) after-treatment process comprises:

a. injecting an additive in liquid form into the exhaust gas stream from the combustion engine;

b. evaporating the additive to form a reducing agent, the reducing agent being added to the exhaust gas stream; and c. reducing nitrogen oxides ($NO_x$) of the exhaust gas stream in a reduction catalyst device through the use of the reducing agent added to the exhaust gas stream;

d. wherein the method comprises:

e. defining an integrand to be the difference between the rate of injection of the additive and the rate of evaporation of the additive to the reducing agent multiplied by a coefficient, wherein the value of the coefficient is between zero and one;

f. producing, by usage of an integral controller, an integral controller output which is proportional to the integral of the integrand with time; and g. requesting a countermeasure at least partly based on the integral controller output to counteract solid deposits derived from the additive.

Thus, when $q_{inj}$ is the rate of injection of the additive, when $q_{evap}$ is the rate of evaporation of the additive to the reducing agent, and when s is said coefficient, the integrand is defined to be $q_{inj} - s \times q_{evap}$ (i.e. $q_{inj}$ minus $s \times q_{evap}$).

By associating said coefficient, which is between zero and one, with the rate of evaporation of the additive to the reducing agent, in said integrand a virtual rate of evaporation of the additive is defined, which is less efficient than the more true definition of the rate of evaporation of the additive. When using this virtually defined rate of evaporation of the additive in the integrand and thus also in the integral controller, it has been shown that the surplus of the additive over time and the risk of solid deposits derived from the additive are reduced compared to comparable prior art solutions while still providing an efficient SCR after-treatment of the exhaust gas. Possibly, the total fuel consumption over time may increase to a certain degree, but not to a large extent. Expressed alternatively, by the introduction of said coefficient and its association with the rate of evaporation of the additive in the integrand, the evaporation arrangement, which is used for evaporating the additive to form a reducing agent, is virtually defined to have a lower or less efficient performance with regard to the rate of evaporation of the additive in relation to a more true or correct definition of the same evaporation arrangement. It may be said that the use of the above-mentioned virtual definition of the rate of evaporation of the additive in the integrand, and thus applied in the integral controller, introduces a certain inertia in the integral controller and/or in the SCR after-treatment of the exhaust gas.

On average, thanks to said coefficient, which is between zero and one, in the integrand integrated by the integral controller, the rate of injection of the additive will better match the rate of evaporation of the additive to the reducing agent. The embodiments of the method according to the first aspect will request a countermeasure, which counteracts solid deposits derived from the additive, which corresponds to the actual performance of the evaporation arrangement of the SCR exhaust gas after-treatment system at the current exhaust gas temperature and the current mass flow rate of the exhaust gas stream.

By means of the embodiments of the method according to the first aspect, a high rate of injection of the additive can be provided to take care of the high level of $NO_x$ in the exhaust gas from the combustion engine while the formation of solid deposits derived from the additive is kept at a minimum or while the risk of formation of solid deposits derived from the additive is kept at a minimum. By means of the embodiments of the method according to the first aspect, on average, the $NO_x$ flow from the combustion engine does not exceed the evaporation capacity of the SCR exhaust gas after-treatment system.

An advantage of the method according to the first aspect is that the amount of solid deposits derived from the additive and formed in an SCR exhaust gas after-treatment system is reduced in relation to prior art solutions. Thus, an advantage of the method according to the first aspect is that solid deposits derived from the additive are counteracted, for example avoided, in an improved manner. An advantage of the method according to the first aspect is that the risk of formation of solid deposits originating or derived from the additive may be minimized. An advantage of the method according to the first aspect is that an advantageous selection of efficient countermeasures is attained, which counteracts solid deposits derived from the additive. Further, an advantage of the method according to the first aspect is that an improved SCR after-treatment of the exhaust gas is provided. The reducing agent may also be called a reductant. The fact that the coefficient is between zero and one means that the coefficient is not zero and not one, but is somewhere therebetween.

According to an advantageous embodiment of the method according to the first aspect, the method comprises:
  a. determining a control variable which is proportional to the integral controller output; and
  b. requesting a countermeasure based on the value of the control variable to counteract solid deposits derived from the additive.

By introducing said control variable, the request of the countermeasure is made more flexible, and a more flexible or tailored selection of countermeasures can be provided. An advantage of this embodiment is that an improved selection of countermeasures is attained, which counteracts solid deposits derived from the additive. An advantage of this embodiment is that an improved SCR after-treatment of the exhaust gas is provided.

According to another advantageous embodiment of the method according to the first aspect, the additive comprises an aqueous urea ($CO(NH_2)_2$) solution. An aqueous urea ($CO(NH_2)_2$) solution is known as an additive with regard to SCR after-treatments of an exhaust gas. Using an aqueous urea ($CO(NH_2)_2$) solution as the additive in the embodiments of the method according to the first aspect further improves the SCR after-treatment of the exhaust gas. The aqueous urea solution may be a solution called diesel exhaust fluid (DEF), or a solution marketed as AdBlue. AdBlue is basically urea mixed with water, for example 32.5 weight percent urea and 67.5 weight percent deionized water. However, other levels than 32.5 weight percent urea and 67.5 weight percent deionized water are possible.

According to yet another advantageous embodiment of the method according to the first aspect, the reducing agent comprises ammonia ($NH_3$). Ammonia ($NH_3$) is known as a reducing agent with regard to SCR after-treatments. Using ammonia ($NH_3$) as the reducing agent in the embodiments of the method according to the first aspect further improves the SCR after-treatment of the exhaust gas.

According to an advantageous embodiment of the method according to the first aspect, the countermeasure, which counteracts solid deposits derived from the additive, comprises any one of the group of:
  a. an engine mode;
  b. a shift of an engine mode to another engine mode;
  c. a change of location of the injection of the additive from a first location to a second location in relation to the reduction catalyst device;
  d. an injection of water into the exhaust gas stream from the combustion engine; and
  e. a reduction of the rate of injection of the additive.

If the countermeasure to be requested is an engine mode or a shift of an engine mode to another engine mode, the newly selected or requested engine mode may correspond to an increase in exhaust gas temperature, which for example may increase the rate of evaporation of the additive to the reducing agent, whereby solid deposits derived from the additive are counteracted. The newly selected or requested engine mode may correspond to a reduction or an increase of the flow rate of the exhaust gas stream, which for example influences the rate of evaporation of the additive to the reducing agent, whereby solid deposits derived from the additive may be counteracted. The newly selected or requested engine mode may correspond to a reduction of the content of nitrogen oxides in the exhaust gas from the combustion engine, whereby less nitrogen oxides need to be reduced and thus less additive can be added for the evaporation of the additive to form the reducing agent, whereby the risk of solid deposits derived from the additive is reduced. An advantage of this embodiment is that an improved and more flexible selection of efficient countermeasures is provided, which counteracts solid deposits derived from the additive. Thus, an advantage of this embodiment is that an improved SCR after-treatment of the exhaust gas is provided.

According to an advantageous embodiment of the method according to the first aspect, the engine mode comprises any one of the group of:
  a. a first engine mode (CM0) corresponding to a first content of nitrogen oxides in the exhaust gas from the combustion engine and a first exhaust gas temperature;
  b. a second engine mode (CM1) corresponding to a higher exhaust gas temperature in relation to the first engine mode (CM0);
  c. a third engine mode (CM2) corresponding to lower content of nitrogen oxides in the exhaust gas from the combustion engine in relation to the first engine mode (CM0); and
  d. a fourth engine mode (CM3) corresponding to a higher exhaust gas temperature and lower content of nitrogen oxides in the exhaust gas from the combustion engine in relation to the first engine mode (CM0).

The first, second, third and fourth engine modes may, under certain conditions, represent efficient countermeasures to counteract solid deposits derived from the additive. By selecting an engine mode from the above-mentioned group of engine modes, an improved SCR after-treatment of the exhaust gas is provided.

According to another advantageous embodiment of the method according to the first aspect, the engine mode comprises any one of the group of:

a. a fifth engine mode (CM4) corresponding to a higher exhaust gas temperature in relation to the second engine mode (CM1);
b. a sixth engine mode (CM5) corresponding to lower content of nitrogen oxides in the exhaust gas from the combustion engine in relation to the third engine mode (CM2); and
c. a seventh engine mode (CM6) corresponding to a higher exhaust gas temperature and lower content of nitrogen oxides in the exhaust gas from the combustion engine in relation to the fourth engine mode (CM3).

The fifth, sixth and seventh engine modes may represent efficient countermeasures to counteract solid deposits derived from the additive. By selecting an engine mode from the fifth, sixth and seventh engine modes, an improved SCR after-treatment of the exhaust gas is provided.

According to a further advantageous embodiment of the method according to the first aspect, the rate of injection of the additive corresponds to a rate of mass transfer, wherein the rate of evaporation of the additive to the reducing agent corresponds to a rate of mass transfer.

According to another advantageous embodiment of the method according to the first aspect, the additive is injected in the form of an injection fluid flow, wherein the rate of injection of the additive corresponds to the flow rate of the injection fluid flow (or the injection fluid flow rate).

According to still another advantageous embodiment of the method according to the first aspect, the flow rate of the injection fluid flow corresponds to a mass flow rate of the injection fluid flow.

According to yet another advantageous embodiment of the method according to the first aspect, the value of the coefficient is between zero and 0.95, such as between zero and 0.91. It has been shown that these two intervals for the coefficient are suitable for the virtual definition (see above) of the virtual rate of evaporation of the additive in the integrand and in the integral controller. These two intervals have been shown to reduce the surplus of the additive over time and reduce the risk of solid deposits derived from the additive while still providing an efficient SCR after-treatment of the exhaust gas. An advantage of this embodiment is that an improved selection of efficient countermeasures is attained, which counteracts solid deposits derived from the additive. Thus, an advantage of this embodiment is that an improved SCR after-treatment of the exhaust gas is provided.

According to a second aspect of the invention, the above mentioned and other objects are achieved with a computer program comprising instructions which, when the program is executed by a computer, cause the computer to carry out the method according to any one of the embodiments disclosed above or below. The advantages of the computer program according to the second aspect correspond to the above- or below-mentioned advantages of the method according to the first aspect and its embodiments.

According to a third aspect of the invention, the above mentioned and other objects are achieved with a computer-readable medium comprising instructions which, when the instructions are executed by a computer, cause the computer to carry out the method according to any one of the embodiments disclosed above or below. The advantages of the computer-readable medium according to the third aspect correspond to the above- or below-mentioned advantages of the method according to the first aspect and its embodiments.

According to an aspect of the present invention, the above-mentioned computer program and computer-readable medium are configured to implement the method and its embodiments described herein.

According to a fourth aspect of the invention, the above mentioned and other objects are achieved with a control arrangement for a process of selective catalytic reduction (SCR) after-treatment of an exhaust gas of an exhaust gas stream from a combustion engine, wherein the selective catalytic reduction (SCR) after-treatment process comprises:
a. injecting an additive in liquid form into the exhaust gas stream from the combustion engine,
b. evaporating the additive to form a reducing agent, the reducing agent being added to the exhaust gas stream, and
c. reducing nitrogen oxides of the exhaust gas stream in a reduction catalyst device through the use of the reducing agent added to the exhaust gas stream,
d. wherein the control arrangement is configured to:
e. define an integrand to be the difference between the rate of injection of the additive and the rate of evaporation of the additive to the reducing agent multiplied by a coefficient, wherein the value of the coefficient is between zero and one;
f. produce, by usage of an integral controller, an integral controller output which is proportional to the integral of the integrand with time; and
g. request a countermeasure at least partly based on the integral controller output to counteract solid deposits derived from the additive.

The advantages of the control arrangement according to the fourth aspect correspond to the above- or below-mentioned advantages of the method according to the first aspect and its embodiments.

It will be appreciated that all the embodiments described for the method aspects of the invention are applicable also to the control arrangement aspects the invention. Thus, all embodiments described for the method aspects of the invention may be performed by the control arrangement, which may include a control unit or a control device. As mentioned above, the control arrangement and its embodiments have advantages corresponding to the advantages mentioned above for the method and its embodiments.

According to a fifth aspect of the invention, the above mentioned and other objects are achieved with a selective catalytic reduction (SCR) exhaust gas after-treatment system comprising
a. an inlet for receiving an exhaust gas stream from a combustion engine,
b. a fluid injector for injecting an additive in liquid form into the exhaust gas stream which has entered the inlet,
c. an evaporation arrangement for evaporating the additive to form a reducing agent, the reducing agent being added to the exhaust gas stream,
d. a reduction catalyst device downstream of the evaporation arrangement, wherein the reduction catalyst device is configured to reduce nitrogen oxides of the exhaust gas stream through the use of the reducing agent added to the exhaust gas stream, and
e. a control arrangement according to any one of the embodiments disclosed above or below.

The advantages of the SCR exhaust gas after-treatment system according to the fifth aspect correspond to the above- or below-mentioned advantages of the method according to the first aspect and its embodiments.

According to a sixth aspect of the invention, the above mentioned and other objects are achieved with a vehicle comprising a. a combustion engine producing an exhaust gas stream upon combustion in the combustion engine, and
b. a selective catalytic reduction (SCR) exhaust gas after-treatment system according to any one of the embodiments disclosed above or below. The selective catalytic reduction (SCR) exhaust gas after-treatment system is downstream of the combustion engine.

The above-mentioned features and embodiments of the method, the computer program, the computer-readable medium, the control arrangement, the SCR exhaust gas after-treatment system and the vehicle, respectively, may be combined in various possible ways providing further advantageous embodiments.

Further advantageous embodiments of the method, the computer program, the computer-readable medium, the control arrangement, the SCR exhaust gas after-treatment system and the vehicle according to the present invention and further advantages with the embodiments of the present invention emerge from the detailed description of embodiments.

BRIEF DESCRIPTION OF THE DRAWINGS

Embodiments of the invention will now be illustrated, for exemplary purposes, in more detail by way of embodiments and with reference to the enclosed drawings, where similar references are used for similar parts, in which.

DETAILED DESCRIPTION

Figure 1:
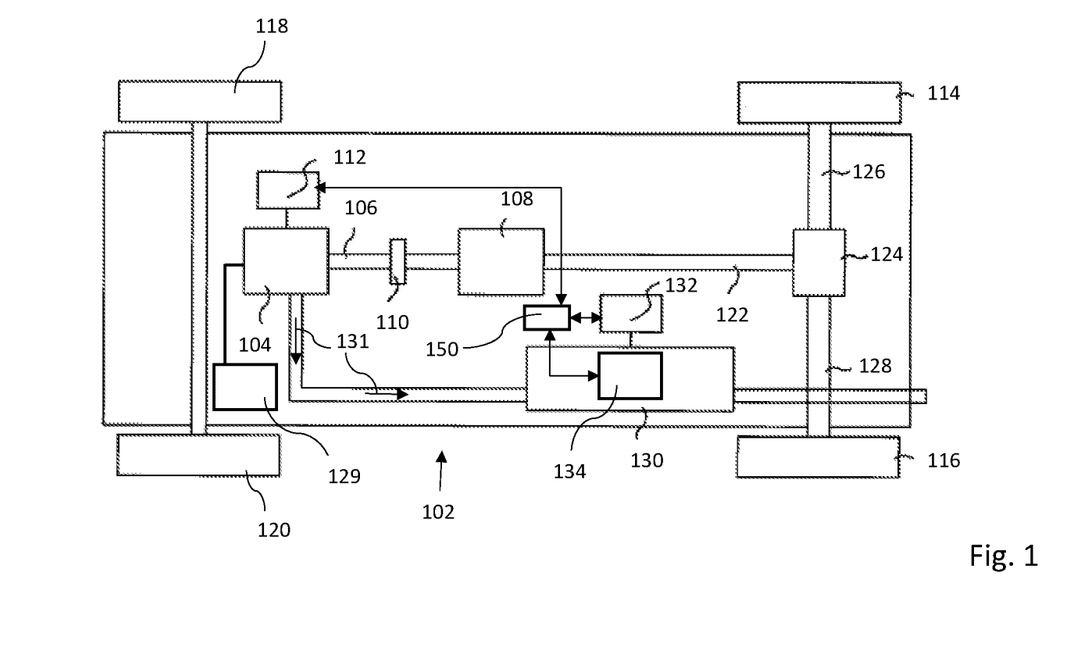
FIG. 1 is a schematic view illustrating an embodiment of the vehicle according to the sixth aspect of the invention, in which embodiments of the present invention may be implemented.

With reference to FIG. 1, a vehicle 100 is schematically shown. The vehicle 100 may be called a motor vehicle 100. The vehicle 100 may be a car, a tractor or a truck, for example a heavy truck, for example provided with a trailer. The vehicle 100 comprises a powertrain 102, which in the shown embodiment comprises a combustion engine 104, for example an internal combustion engine or another combustion engine, which in a conventional manner, via a first output shaft 106 and usually via a flywheel, is connected to a gearbox 108 via a clutch 110. In general, the combustion engine 104 comprises cylinders. In addition to the powertrain 102 comprising a combustion engine 104, the vehicle 100 may include one or more electrical machines for driving drive wheels 114, 116, 118, 120 of the vehicle 100 and may thus for example be a so-called hybrid vehicle. The electrical machines may be provided with electric power from an electrical energy unit 168, which for example may include an electric battery unit.

The combustion engine 104 is controlled by the engine's control system via a control device 112. Likewise, the clutch 110 and the gearbox 108 may be controlled by the engine's control system, with the help of one or more control devices (not shown). The control device 112 and/or another control device may thus be configured to control the combustion engine 104, the clutch 110, the gearbox 108, and/or any other units/devices/entities of the vehicle 100. However, in FIG. 1, only the units/devices/entities of the vehicle 100 useful for understanding the embodiments of the present invention are illustrated.

Naturally, the powertrain 102 of the vehicle 100 may be of a different type, such as a type with a conventional automatic gearbox, a type with a hybrid driveline etc. As mentioned above, the powertrain 102 may include one or more electrical machines for driving the drive wheels 114, 116, 118, 120 of the vehicle 100, implementing a so-called hybrid drive. In the shown embodiment, the vehicle 100 comprises four wheels 114, 116, 118, 120, but may have more wheels. The electrical machine may be arranged essentially anywhere, as long as torque is provided to one or more of the wheels 114, 116, 118, 120, for example adjacent to one or more of the wheels 114, 116, 118, 120, or along a propeller shaft 122 of the vehicle 100, for example between the gearbox 108 and the clutch 110, as is understood by a skilled person.

The vehicle 100 may comprise a propeller shaft 122 from the gearbox 108 which drives two of the wheels 114, 116 via a central gear 124, for example a conventional differential, and two drive shafts 126, 128 of the vehicle 100. The two drive shafts 126, 128 are connected to the central gear 124. The vehicle 100 may comprise a fuel tank 129 coupled to the combustion engine 104, and the combustion engine 104 may be provided with fuel from the fuel tank 129.

The vehicle 100 may comprise an exhaust gas after-treatment system 130 for treatment/purification of an exhaust gas/emissions of an exhaust gas stream 131 (indicated with arrows) from the combustion engine 104. The exhaust gas/emissions is/are the result of the combustion in the combustion chamber of the combustion engine 104. The exhaust gas after-treatment system 130 may also be called an exhaust gas purification system.

The exhaust gas after-treatment system 130 may comprise a selective catalytic reduction (SCR) exhaust gas after-treatment system 134 for SCR after-treatment of the exhaust gas of the exhaust gas stream 131 from the combustion engine 104. However, it should be noted that the SCR exhaust gas after-treatment system 134 may be present in the vehicle 100 without the exhaust gas after-treatment system 130 or separated from exhaust gas after-treatment system 130. Thus, the vehicle 100 may comprise the SCR exhaust gas after-treatment system 134 excluding the exhaust gas after-treatment system 130. The SCR exhaust gas after-treatment system 134 may be located within the exhaust gas after-treatment system 130 or outside the the exhaust gas after-treatment system 130 upstream or downstream of the the exhaust gas after-treatment system 130. The exhaust gas after-treatment system 130 may comprise additional units, for example purifying units, such as one or more filters, or one or more catalysts, not shown in FIG. 1.

Figure 2:
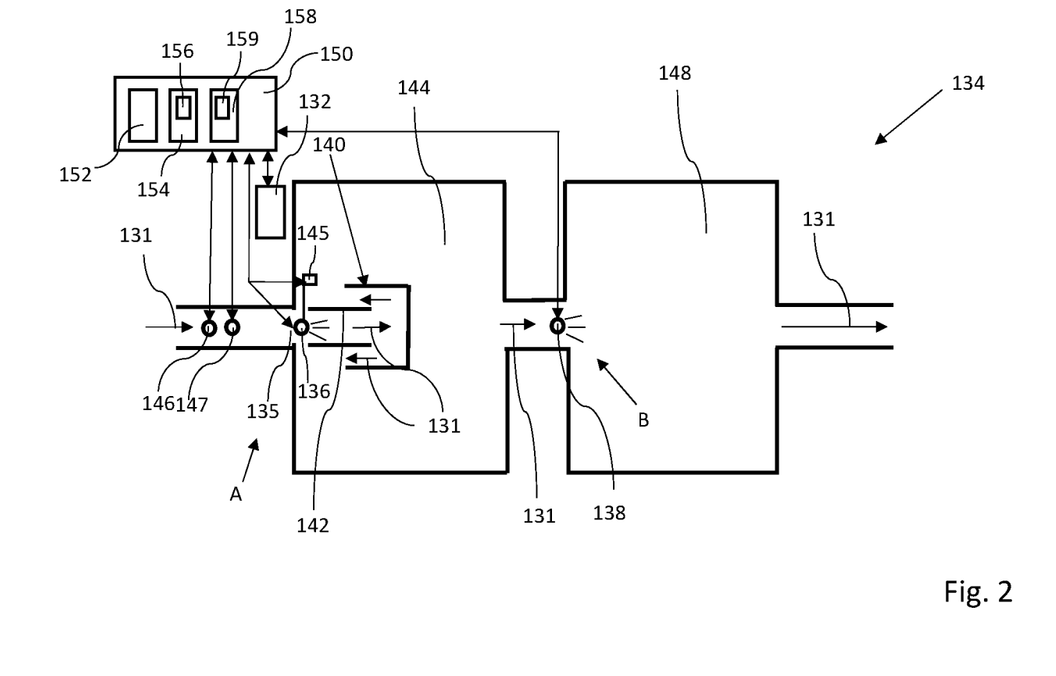
FIG. 2 is an enlargement of the SCR exhaust gas after-treatment system of FIG. 1 illustrating the SCR exhaust gas after-treatment system according to the fifth aspect and the control arrangement according to the fourth aspect of the invention in more detail.

With reference to FIG. 2, which is an enlarged view of the SCR exhaust gas after-treatment system 134 of FIG. 1, the SCR exhaust gas after-treatment system 134 includes an inlet 135 for receiving the exhaust gas stream 131 from the combustion engine 104. Further, the SCR exhaust gas after-treatment system 130 includes a fluid injector 136 for injecting an additive in liquid form into the exhaust gas stream 131 which has entered the inlet 135 of the SCR exhaust gas after-treatment system 134. The additive may comprise a solution including urea, for example AdBlue mentioned above. The fluid injector 136 may be located downstream of the inlet 135. In alternative embodiments, the fluid injector 136 may be located elsewhere, and the fluid injector 136 may be configured to inject an additive in liquid form into a cylinder of the combustion engine 104 or to the exhaust port of the combustion engine 104.

Optionally, the SCR exhaust gas after-treatment system 130 may also comprise a second fluid injector 138 for injecting a second additive. The second additive may be the same as the additive from the fluid injector 136 or a different additive. The fluid injector 136 may be configured to inject the additive in the form of an injection fluid flow. The second fluid injector 138 may also be configured to inject the second additive in the form of an injection fluid flow. The second fluid injector 138 may be located downstream of the fluid injector 136. However, it is to be understood that the second fluid injector 138 may be excluded in embodiments of the present invention. Optionally, the SCR exhaust gas after-treatment system 130 may comprise one or more additional fluid injectors for the injection of an additional additive in addition to the fluid injector 136 and the second fluid injector 138. The additional additive may be the same as the additive from the fluid injector 136 and/or the second fluid injector 138 or a different additive.

With reference to FIG. 2, the SCR exhaust gas after-treatment system 134 includes an evaporation arrangement 140 for evaporating the additive to form a reducing agent (for example ammonia). The reducing agent may be called a reductant. The evaporation arrangement 140 may be located downstream of the fluid injector 136. The evaporation arrangement 140 may include the fluid injector 136. The reducing agent is added to the exhaust gas stream 131. The evaporation arrangement 140 may include one or more evaporation surfaces 142 onto which the additive may be sprayed or applied via the fluid injector 136. In the shown evaporation arrangement 140, the main evaporation of the additive to form the reducing agent may occurs when the additive is located on the evaporation surface 142. The evaporation surface 142 is preferably not cold and may for example be heated. It is to be understood that the evaporation arrangement 140 may be designed or structured in several possible ways different from the structure shown in FIG. 2.

The SCR exhaust gas after-treatment system 134 includes a reduction catalyst device 144 downstream of the evaporation arrangement 140. The reduction catalyst device 144 is configured to reduce nitrogen oxides ($NO_x$) of the exhaust gas stream 131 through the use of the reducing agent (for example ammonia) added to the exhaust gas stream 131. Optionally, the SCR exhaust gas after-treatment system 134 may include a second reduction catalyst device 148. The second fluid injector 138 may be located downstream of the reduction catalyst device 144. Thus, the second reduction catalyst device 148 may be located downstream of the reduction catalyst device 144. However, it is to be understood that the second reduction catalyst device 148 may be excluded in embodiments of the present invention. In alternative embodiments, the reduction catalyst device 144 may be excluded and the second reduction catalyst 148 may remain, whereby the fluid injector 136 and the second fluid injector 138 are both located upstream of the remaining second reduction catalyst device 148, wherein the fluid injector 136 is located upstream of the second fluid injector 138. Additional units, for example purifying units, such as one or more filters, and/or one or more catalysts, may be located between the reduction catalyst device 144 and the second reduction catalyst device 148, before the reduction catalyst device 144 and/or after the second reduction catalyst device 148. Various reduction catalysts for SCR after-treatment of the exhaust gas are known to the skilled person and thus disclosed in further detail.

The vehicle 100 includes an exhaust gas treatment controller 132 for controlling the treatment of the exhaust gas of the exhaust gas stream 131 from the combustion engine 104. The exhaust gas treatment controller 132 is configured to control a process of SCR after-treatment 200 (see FIGS. 3 and 4) of the exhaust gas of the exhaust gas stream 131 from the combustion engine 104. The SCR after-treatment process 200 includes the injection 201 of the additive in liquid form into the exhaust gas stream 131 from the combustion engine 104, the evaporation 202 of the additive to form the reducing agent and the reduction 203 of nitrogen oxides $NO_x$ of the exhaust gas stream 131 in the reduction catalyst device 144 through the use of the reducing agent added to the exhaust gas stream 131. The exhaust gas treatment controller 132 may be configured to directly or indirectly communicate with the fluid injector 136 and/or the second fluid injector 138. Thus, the exhaust gas treatment controller 132 may be configured to control the fluid injector 136 and thus control the injection of the additive in liquid from the fluid injector 136. If a second fluid injector 138 is provided, the exhaust gas treatment controller 132 may be configured to the control the second fluid injector 138 and thus control the injection of the additive in liquid from the second fluid injector 138.

With reference to FIG. 1, the SCR exhaust gas after-treatment system 134 includes a control arrangement 150. The control arrangement 150 may be directly or indirectly connected to and communicate with the engine's control system, for example the control device 112, of the vehicle 100. The control arrangement 150 may be directly or indirectly connected to and communicate with the exhaust gas treatment controller 132.

With reference to FIG. 2, the control arrangement 150 may be configured to directly or indirectly communicate with the fluid injector 136 and/or the second fluid injector 138. The control arrangement 150 may be configured to control the fluid injector 136 and thus control the injection of the additive in liquid from the fluid injector 136. If a second fluid injector 136 is provided, the control arrangement 150 may be configured to the control the second fluid injector 138 and thus control the injection of the additive in liquid from the fluid injector 138. The control arrangement 150 is disclosed in further detail hereinbelow.

With reference to FIG. 2, the SCR exhaust gas after-treatment system 134 may include a fluid flow sensor 145 for determining, for example measuring, the rate of injection of the additive injected by the fluid injector 136. In some embodiments of the present invention, the rate of injection of the additive is not measured directly but instead determined based on other variables, such as the injection pressure and how long time the orifice of the fluid injector 136 has been open. The SCR exhaust gas after-treatment system 134 may include an exhaust gas flow sensor 146 for determining, for example measuring, the flow rate (for example mass flow rate) of the exhaust gas stream 131 originating from the combustion engine 104. In some embodiments of the present invention, the flow rate of the exhaust gas stream 131 is not measured directly but instead determined based on other variables, a model, a map and/or a table. The SCR exhaust gas after-treatment system 134 may include an exhaust gas temperature sensor 147 for determining, for example measuring, the temperature of the exhaust gas of the exhaust gas stream 131 originating the from the combustion engine 104. The control arrangement 150 may be configured to directly or indirectly communicate with the fluid flow sensor 145, the exhaust gas flow sensor 146 and the exhaust gas temperature sensor 147. The exhaust gas treatment controller 132 may be configured to directly or indirectly communicate with the fluid flow sensor 145, the exhaust gas flow sensor 146 and the exhaust gas temperature sensor 147.

Thus, with reference to FIG. 1, the vehicle 100 includes the combustion engine 104 producing the exhaust gas stream 131 upon combustion in the combustion engine 104 of the vehicle 100, and the vehicle 100 thus includes the SCR exhaust gas after-treatment system 134 as disclose above and/or below, wherein the SCR exhaust gas after-treatment system 134 is located downstream of the combustion engine 104 of the vehicle 100.

Figure 3:
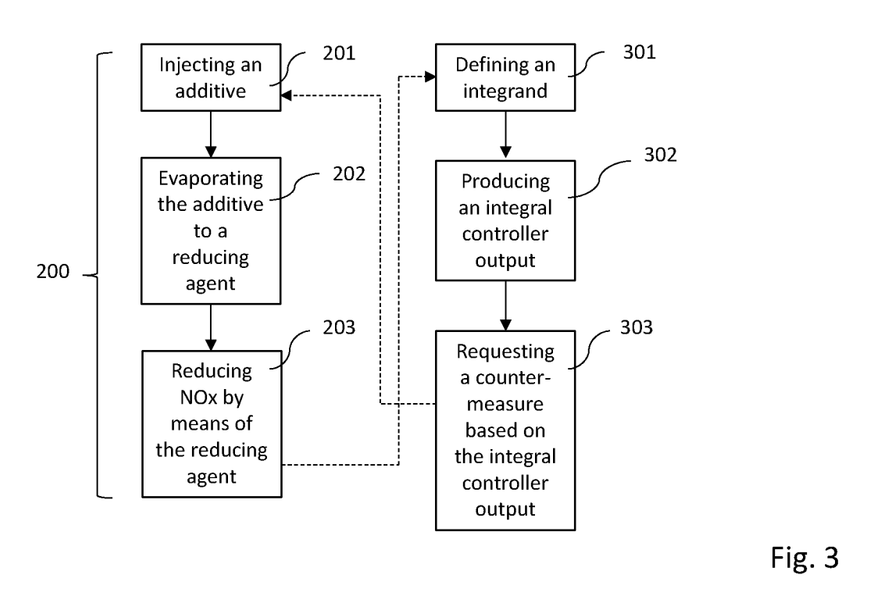
FIG. 3 is a schematic flow chart illustrating aspects of a first embodiment of the method according to the first aspect.

With reference to FIG. 3, aspects of a first embodiment of the method for a process of SCR after-treatment 200 of an exhaust gas of an exhaust gas stream 131 from a combustion engine 104 according to the first aspect are illustrated.

The SCR after-treatment process 200 comprises:
a. injecting 201 an additive in liquid form into the exhaust gas stream 131 from the combustion engine 104;
b. evaporating 202 the additive to form a reducing agent, the reducing agent being added to the exhaust gas stream 131; and
c. reducing 203 nitrogen oxides of the exhaust gas stream 131 in the reduction catalyst device 144 through the use of the reducing agent added to the exhaust gas stream 131.

The SCR after-treatment process 200 may comprise the step of receiving the exhaust gas stream 131 from the combustion engine 104 of the vehicle 100.

The first embodiment of the method includes:
a. defining 301 an integrand to be the difference between the rate of injection of the additive and the rate of evaporation of the additive to the reducing agent multiplied by a coefficient s, wherein the value of the coefficient s is between zero and one. "Between zero and one" means that the coefficient s is not zero and not one, but somewhere therebetween, or expressed differently, "between zero and one" excludes the number zero and excludes the number one, i.e. does not include zero and does not include the number one;
b. producing 302, by usage of an integral controller 156 (see FIG. 2), an integral controller output which is proportional to the integral of the integrand with time (or over time or with respect to time); and
c. requesting 303 a countermeasure at least partly based on the integral controller output to counteract solid deposits derived from the additive.

Figure 4:
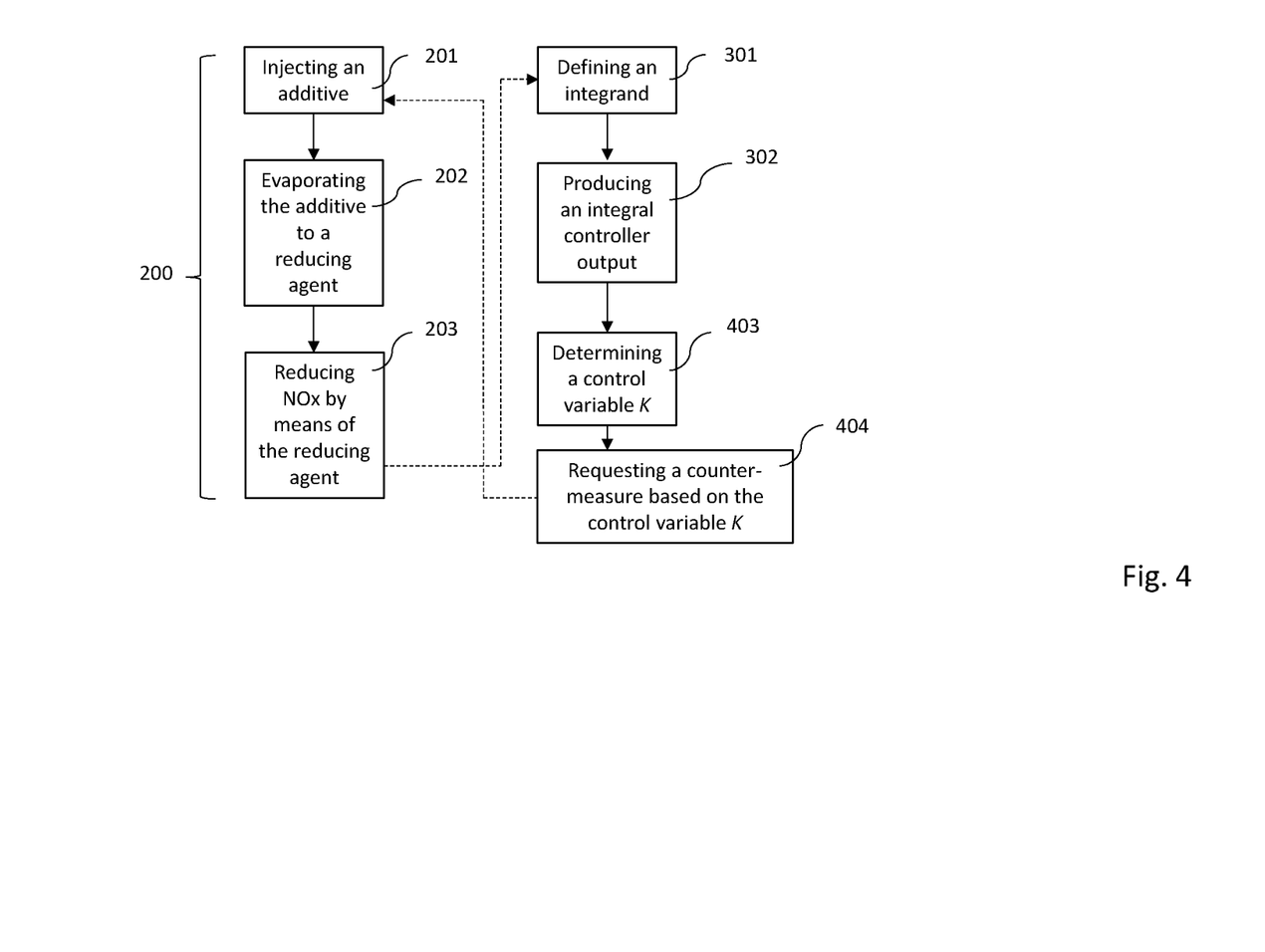
FIG. 4 is a schematic flow chart illustrating aspects of a second embodiment of the method according to the first aspect.

With reference to FIG. 4, aspects of a second embodiment of the method for a process of SCR after-treatment 200 of an exhaust gas of an exhaust gas stream 131 from a combustion engine 104 according to the first aspect are illustrated. The steps 201-203 and 301-302 in FIG. 4 correspond to the steps 201-203 and 301-302 in FIG. 3 and are thus not disclosed again in detail. However, instead of step 303 in FIG. 3, the second embodiment of the method includes:
a. determining 403 a control variable K which is proportional to the integral controller output; and
b. requesting 404 a countermeasure based on the value of the control variable K to counteract solid deposits derived from the additive.

The values of the control variable K may be calibrated in order to obtain a desired activity of the regulation/control or the requests for countermeasures. Thus, the values of the control variable K may thus define discrete countermeasures. Therefore, a specific value of the control variable K may correspond to a specific countermeasure disclosed below. However, in alternative embodiments, the values of the control variable K may define non-discrete countermeasures, i.e., for example, the combustion engine may be controlled to continuously change the content of nitrogen oxides in the exhaust gas and/or to continuously change the exhaust gas temperature, for example along a smooth graph, based on the values of the control variable K.

More specifically, the integrand may be defined to be $q_{inj} - s \times q_{evap}$ (i.e. $q_{inj}$ minus $s \times q_{evap}$), where $q_{inj}$ is the rate of injection of the additive, $q_{evap}$ is the rate of evaporation of the additive to the reducing agent, and where s is the coefficient.

Each embodiment of the method according to the first aspect may include the steps of obtaining and/or determining, for example measuring, the rate of injection of the additive and the steps of obtaining and/or determining, for example measuring, the rate of evaporation of the additive to the reducing agent.

The additive may include an aqueous urea ($CO(NH_2)_2$) solution, such as AdBlue or DEF. In general, AdBlue comprises 32.5 weight percent urea and 67.5 weight percent deionized water. However, other levels than 32.5 weight percent urea and 67.5 weight percent deionized water are possible. The reducing agent may include ammonia ($NH_3$). Thus, the ammonia may be stored as AdBlue or DEF before usage in the reduction catalyst device 144 in accordance with the process of SCR after-treatment 200 of the exhaust gas.

In general, in order to derive ammonia ($NH_3$) from urea ($CO(NH_2)_2$), the aqueous urea solution undergoes thermolysis and hydrolysis. In general, upon the thermolysis, $CO(NH_2)_2$ (urea) turns into $HNCO + NH_3 + H_2O$. Upon the hydrolysis, $HNCO + H_2O$ turn into $NH_3 + CO_2$.

An evaporation capacity of the SCR exhaust gas after-treatment system 134 may be defined as an evaporation of a maximum amount of urea or AdBlue to ammonia without the formation of any solid deposits derived from the urea or AdBlue. The formation of solid deposits derived from urea or AdBlue occurs when urea reacts with itself, i.e. $CO(NH_2)_2 + HNCO$ turn into a variety of solid deposits including, for example, one or more of the group of: hydrogen, nitrogen, carbon, biuret, triuret, ammelide and cyanuric acid. Other solid deposits are possible. When the rate of injection of urea or AdBlue exceeds the evaporation capacity of the SCR exhaust gas after-treatment system 134, said solid deposits may be formed in the SCR exhaust gas after-treatment system 134, for example in the evaporation arrangement 140 of the SCR exhaust gas after-treatment system 134.

The evaporation capacity of the SCR exhaust gas after-treatment system 134 for steady state operation is at least dependent on the exhaust gas temperature (i.e. the temperature of the exhaust gas leaving the combustion engine 104), the mass flow rate of the exhaust gas stream 131 and the structure and configuration of the evaporation arrangement 140 of the SCR exhaust gas after-treatment system 134. The evaporation capacity for steady state operation of a specific SCR exhaust gas after-treatment system 134 can be attained through engine tests for various exhaust gas temperatures and mass flow rates of the exhaust gas stream 131. The resulting values may be put in a map or table, for example a look-up table. Likewise, the current rate of evaporation of the additive to the reducing agent may be attained through a map or table, for example a look-up table, based on engine tests for various exhaust gas temperatures and mass flow rates of the exhaust gas stream 131. Thus, through the map or table, a current rate of evaporation of the additive to the reducing agent may be determined for a current exhaust gas temperature and a current mass flow rate of the exhaust gas stream 131. As mentioned above, the flow rate of the exhaust gas stream 131 may be determined by means of the exhaust gas flow sensor 146, or determined based on a model, a map and/or a table as mentioned above. The temperature of the exhaust gas of the exhaust gas stream 131 may be determined by means of the exhaust gas temperature sensor 147, or determined based on a model, a map and/or a table. Thus, for example, the control arrangement 150 may be configured to determine a current rate of evaporation of the additive to the reducing agent based on the input form the exhaust gas flow sensor 146 and the input from the exhaust gas temperature sensor 147.

In general, upon transient operation conditions, i.e. not steady state operation, the evaporation capacity of the SCR exhaust gas after-treatment system 134 increases. Thus, upon transient operation conditions, the rate of injection of urea or AdBlue may exceed the evaporation capacity for steady state operation of the SCR exhaust gas after-treatment system 134 without the formation of solid deposits derived from urea or AdBlue.

In the reduction catalyst device 144, ammonia reacts with $NO_x$, whereupon $NO_x$, is turned into $N_2$ and $H_2O$.

The above-mentioned countermeasure requested, which counteracts solid deposits derived from the additive, may include any one of the group of:

a. an engine mode;
b. a shift of an engine mode to another engine mode;
c. a change of location of the injection of the additive from a first location A (see FIG. 2) to a second location B (see FIG. 2), or vice versa, in relation to the reduction catalyst device 144;
d. an injection of water into the exhaust gas stream 131 from the combustion engine 104, for example an injection of water into the evaporation arrangement 140, for example onto the evaporation surface 142 of the evaporation arrangement 140; and
e. a reduction of the rate of injection of the additive.

With reference to FIG. 2, the injection of the additive may also be moved from a first location A to another location in addition to the shown second location B or to any one of a plurality of positions in addition to the shown second location B. The movement of the injection of the additive from a first location A to a second location B may be performed before requesting an engine mode or a shift of an engine mode to another engine mode.

The above-mentioned engine mode may comprise any one of the group of:

a. a first engine mode CM0 corresponding to a first content of nitrogen oxides, such as high content of nitrogen oxides, in the exhaust gas from the combustion engine 104 and a first exhaust gas temperature, such as a low exhaust gas temperature. The first engine mode CM0 may be described as corresponding to an optimal total fuel consumption, for example a low total fuel consumption, with regard to the hardware of the combustion engine 104. The hardware of the combustion engine 104 may include one or more of the group: the design of the piston of the combustion engine 104, the design of the fuel injector of the combustion engine 104, and the number of fuel injector orifices etc.;

b. a second engine mode CM1 corresponding to a higher exhaust gas temperature in relation to the first engine mode CM0;
c. a third engine mode CM2 corresponding to lower content of nitrogen oxides in the exhaust gas from the combustion engine 104 in relation to the first engine mode CM0; and
d. a fourth engine mode CM3 corresponding to both a higher exhaust gas temperature and lower content of nitrogen oxides in the exhaust gas from the combustion engine 104 in relation to the first engine mode CM0.

Thus, the engine mode may include, or may correspond to, the above-mentioned first engine mode CM0, the above-mentioned second engine mode CM1, the above-mentioned third engine mode CM2 or the above-mentioned fourth engine mode CM3. Expressed differently, the engine mode may be picked from the above-mentioned group of engine modes. It is to be understood that the group of engine modes may comprise fewer engine modes or additional engine modes. For example, the group of engine modes may include the following additional engine modes:

a. a fifth engine mode CM4 corresponding to a higher exhaust gas temperature in relation to the second engine mode CM1;
b. a sixth engine mode CM5 corresponding to lower content of nitrogen oxides in the exhaust gas from the combustion engine 104 in relation to the third engine mode CM2; and
c. a seventh engine mode CM6 corresponding to both a higher exhaust gas temperature and lower content of nitrogen oxides in the exhaust gas from the combustion engine 104 in relation to the fourth engine mode CM3. However, it is to be understood that other additional engine modes are also possible.

In general, an increase of the fuel consumption of the combustion engine 104 may result in an increase of the exhaust gas temperature. According to the embodiments of the method according to the first aspect, the countermeasure requested may include shifting between the above-mentioned engine modes CM0, CM1, CM2 and CM3 and optionally in addition the above-mentioned additional engine modes CM4, CM5 and CM6. As a result of the embodiments of the invention, a more consistent behavior of the engine mode request in transient operation is attained, such that for current operation the evaporation capacity for steady state operation of the SCR exhaust gas after-treatment system 134 is not constantly exceeded. The embodiments of the method according to the first aspect aim at requesting a countermeasure whose $NO_x$-level corresponds to the actual evaporation capacity of the SCR exhaust gas after-treatment system 134. On average, thanks to the value of the coefficient s being between zero and one in the integrand integrated by the integral controller 156, the rate of injection of the additive (for example AdBlue) will better match the rate of evaporation of the additive to the reducing agent (for example ammonia). The embodiments of the method according to the first aspect request a countermeasure, for example an engine mode, which corresponds to the actual performance of the evaporation arrangement 140 of the SCR exhaust gas after-treatment system 134 at the current exhaust gas temperature and the current mass flow rate of the exhaust gas stream 131.

In view of environmental aspects, the amount of $NO_x$ released together with the exhaust gas to the ambient air from the vehicle 100 should be reduced or kept low. In general, a low level of $NO_x$ in the exhaust gas from the combustion engine 104 means a high fuel consumption of the engine 104. In general, a high level of fuel consumption of the engine 104 is not desired. Thus, to simply keep the $NO_x$ at a low level to keep the urea or AdBlue injection at a low level and thus reduce the risk of formation of solid deposits derived from urea or AdBlue is not a desired path. A low level of fuel consumption of the engine 104 means a high level of $NO_x$ in the exhaust gas from the combustion engine 104. Thus, to maintain a low level of fuel consumption of the engine 104, there should be a high level of urea or AdBlue (additive) injection to take care of the high level of $NO_x$ in the exhaust gas from the combustion engine 104. By means of the embodiments of the present invention, a high level of urea or AdBlue injection (i.e. a high rate of injection of the additive) can be provided to take care of the high level of $NO_x$ in the exhaust gas from the combustion engine 104 while the formation of solid deposits derived from the additive (for example urea or AdBlue) is kept at a minimum or while the risk of formation of solid deposits derived from the additive (for example urea or AdBlue) is kept at a minimum. By means of the embodiments of the present invention, a high level of urea or AdBlue injection (i.e. a high rate of injection of the additive) can be provided without injecting too much urea or AdBlue which is not evaporated. By means of the embodiments of the present invention, on average, the $NO_x$ flow from the combustion engine 104 does not exceed the evaporation capacity of the SCR exhaust gas after-treatment system 134.

The rate of injection of the additive may correspond to a rate of mass transfer, and the rate of evaporation of the additive to the reducing agent may correspond to a rate of mass transfer. Each rate of mass transfer may be given in grams per minute, or grams per second, or kilograms per minute etc. The additive may be injected in the form of an injection fluid flow, wherein the rate of injection of the additive corresponds to the flow rate of the injection fluid flow (or injection fluid flow rate). The rate of injection or the flow rate of the injection fluid flow may also be given in grams per minute. The flow rate of the injection fluid flow may correspond to a mass flow rate of the injection fluid flow. A maximum rate of injection of urea or AdBlue in the SCR exhaust gas after-treatment system 134 may be around 200 grams per minute. However, other levels are possible. During steady state conditions or steady state operation, the average rate of injection of urea or AdBlue may be around 30-40 grams per minute. The mass flow rate of the exhaust gas stream 131 may also be given in grams per minute, or grams per second, or kilograms per minute etc.

The inventors have found that a value of the coefficient s which is between zero and 0.95 is advantageous, not including zero and 0.95. The inventors have found that a value of the coefficient s which is between zero and 0.91, not including zero and 0.91, is even more advantageous. The inventors have found that a value of the coefficient s which is around 0.9, or precisely 0.9, is advantageous. It has been shown that the-above mentioned intervals for the coefficient s and the above-mentioned values of the coefficient s are suitable for the virtual definition (see above) of the virtual rate of evaporation of the additive in the integrand and in the integral controller 156. These intervals for s and values of s have been shown to reduce the surplus of the additive over time and reduce the risk of solid deposits derived from the additive while still providing an efficient SCR after-treatment of the exhaust gas. The value of the coefficient s may be determined based on road cycles or engine or vehicle tests.

Unless disclosed otherwise, it should be noted that the method steps illustrated in FIGS. 3 and 4 and described herein do not necessarily have to be executed in the order illustrated in FIGS. 3 and 4. The steps may essentially be executed in any suitable order. Further, one or more steps may be excluded or added without departing from the scope of the appended claims.

With reference to FIG. 2, the shown control arrangement 150 may include an integrand defining unit 152 for defining an integrand to be the difference between the rate of injection of the additive and the rate of evaporation of the additive to the reducing agent multiplied by a coefficient s, wherein the value of the coefficient s is between zero and one, to perform the step 301 in FIGS. 3 and 4.

The shown control arrangement 150 may include an integral controller output producing unit 154, for example including an integral controller 156, for producing, by usage of the integral controller 156, an integral controller output which is proportional to the integral of the integrand with time (or over time or with respect to time) to perform the step 302 in FIGS. 3 and 4.

The shown control arrangement 150 may include a countermeasure request unit 158—for requesting a countermeasure at least partly based on the integral controller output to counteract solid deposits derived from the additive to perform the step 303 in FIG. 3 and the step 404 in FIG. 4. The countermeasure request unit 158 may include a control variable determination functionality 159 for determining a control variable K which is proportional to the integral controller output, and the countermeasure request unit 158 may be configured to request countermeasure based on the value of the control variable K to counteract solid deposits derived from the additive. The countermeasure request unit 158 may be directly or indirectly connected to the engine's control system, for example the control device 112, of the vehicle 100 and may be configured to directly or indirectly communicate with the engine's control system, for example the control device 112. The countermeasure request unit 158 may be directly or indirectly connected to the exhaust gas treatment controller 132 and may be configured to directly or indirectly communicate with the exhaust gas treatment controller 132. Alternatively, the countermeasure request unit 158 may be directly connected to the fluid injector 136 and/or the second fluid injector 138 and may be configured to directly communicate with the fluid injector 136 and/or the second fluid injector 138.

Figure 5:
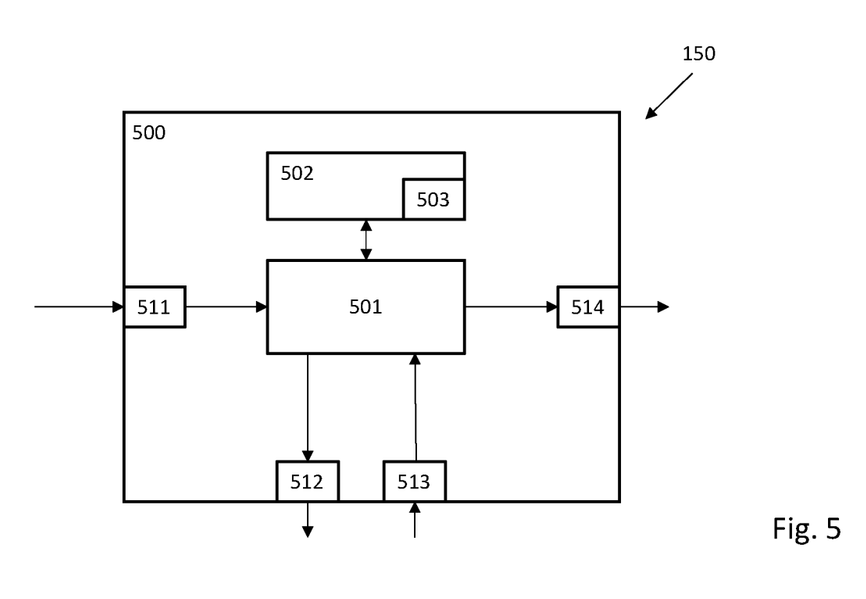
FIG. 5 is a schematic view illustrating an embodiment of the control arrangement according to the fourth aspect of the invention, in which a method according to any one of the herein described embodiments may be implemented.

FIG. 5 shows in schematic representation a control arrangement 150, which may include a control unit 500, which may correspond to or may include one or more of the above-mentioned units 152, 154, 158 of the control arrangement 150. The control unit 500 may comprise a computing unit 501, which can be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 501 is connected to a memory unit 502 arranged in the control unit 500. The memory unit 502 provides the computing unit 501 with, for example, the stored program code and/or the stored data which the computing unit 501 requires to be able to perform computations. The computing unit 501 is also arranged to store partial or final results of computations in the memory unit 502.

In addition, the control unit 500 may be provided with devices 511, 512, 513, 514 for receiving and transmitting input and output signals. These input and output signals can contain waveforms, impulses, or other attributes which, by means of the devices 511, 513 for the reception of input signals, can be detected as information and can be converted into signals which can be processed by the computing unit 501. These signals are then made available to the computing unit 501. The devices 512, 514 for the transmission of output signals are arranged to convert signals received from the computing unit 501 in order to create output signals by, for example, modulating the signals, which can be transmitted to other parts of and/or systems in the vehicle 100.

Each of the connections to the devices for receiving and transmitting input and output signals can be constituted by one or more of a cable; a data bus, such as a CAN bus (Controller Area Network bus), a MOST bus (Media Orientated Systems Transport bus), or some other bus configuration; or by a wireless connection.

Control systems in modern vehicles commonly comprise communication bus systems consisting of one or more communication buses for linking a plurality of electronic control units (ECU's), or controllers, and various components located on the vehicle. Such a control system can comprise a large number of control units and/or control arrangements and the responsibility for a specific function can be divided amongst more than one control unit. Vehicles of the shown type thus often comprise significantly more control units or control arrangements than are shown in FIGS. 1 and 2, which is well known to the person skilled in the art within this technical field. Alternatively or in addition thereto, the embodiments of the present invention may be implemented wholly or partially in one or more other control units already present in the vehicle.

Here and in this document, units are often described as being provided for performing steps of the method according to embodiments of the invention. This also includes that the units are designed to and/or configured to perform these method steps.

The units 152, 154, 158 of the control arrangement 150 are in FIG. 2 illustrated as separate units. These units 152, 154, 158 may, however, be logically separated but physically implemented in the same unit, or can be both logically and physically arranged together. These units 152, 154, 158 may for example correspond to groups of instructions, which can be in the form of programming code, that are input into, and are utilized by a processor/computing unit 501 (see FIG. 5) when the units are active and/or are utilized for performing its method step.

The control arrangement 150, which may include one or more control units 500, e.g. a device or a control device, according to embodiments of the present invention may be arranged to perform all of the method steps mentioned above, in the claims, and in connection with the herein described embodiments. The control arrangement 150 is associated with the above described advantages for each respective embodiment.

According to the second aspect of the invention, a computer program 503 (see FIG. 5) is provided, comprising instructions which, when the program is executed by a computer, cause the computer to carry out the method according to one or more of the embodiments disclosed above.

According to the third aspect of the invention, a computer-readable medium is provided, comprising instructions which, when the instructions are executed by a computer, cause the computer to carry out the method according to one or more of the embodiments disclosed above.

The person skilled in the art will appreciate that the herein described embodiments of the method according to the first aspect may be implemented in a computer program, which, when it is executed in a computer, instructs the computer to execute the method. The computer program is usually constituted by a computer program product 503 (see FIG. 5) stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

Although embodiments of the present invention have been disclosed in connection with a vehicle with wheels, it is to be understood that the method according to the first aspect, the computer program according to the second aspect, the computer-readable medium according to the third aspect, the control arrangement according to the fourth aspect and the SCR exhaust gas after-treatment system according to the fifth aspect may be applied to a combustion engine not included in a vehicle or applied to a combustion engine included in a vehicle without wheels, for example a vessel or a boat.

The present invention is not limited to the above described embodiments. Instead, the present invention relates to, and encompasses all different embodiments being included within the scope of the independent claims.

The invention claimed is:

1. A method for counteracting solid deposits derived from an additive of selective catalytic reduction (SCR) after-treatment system of an exhaust gas of an exhaust gas stream from a combustion engine, wherein the selective catalytic reduction after-treatment system process comprises: injecting the additive in liquid form into the exhaust gas stream from the combustion engine; evaporating the additive to form a reducing agent, the reducing agent being added to the exhaust gas stream; and reducing nitrogen oxides of the exhaust gas stream in a reduction catalyst device through the use of the reducing agent added to the exhaust gas stream; wherein the method comprises:
   defining an integrand to be the difference between a rate of injection of the additive and a rate of evaporation of the additive to the reducing agent multiplied by a coefficient, wherein the value of the coefficient is between zero and one;
   producing, by usage of an integral controller, an integral controller output which is proportional to the integral of the integrand with time; and
   requesting a countermeasure at least partly based on the integral controller output to counteract solid deposits derived from the additive.

2. The method according to claim 1, wherein the method comprises: determining a control variable (K) which is proportional to the integral controller output; and requesting a countermeasure based on the value of the control variable (K) to counteract solid deposits derived from the additive.

3. The method according to claim 1, wherein the additive comprises an aqueous urea solution.

4. The method according to claim 1, wherein the reducing agent comprises ammonia.

5. The method according to claim 1, wherein the countermeasure comprises any one of the group of: an engine mode; a shift of an engine mode to another engine mode; a change of location of the injection of the additive from a first location (A) to a second location (B) in relation to the reduction catalyst device; an injection of water into the exhaust gas stream from the combustion engine; and a reduction of the rate of injection of the additive.

6. The method according to claim 5, wherein the engine mode comprises any one of the group of: a first engine mode corresponding to a first content of nitrogen oxides in the exhaust gas from the combustion engine and a first exhaust gas temperature; a second engine mode corresponding to a higher exhaust gas temperature in relation to the first engine mode; a third engine mode corresponding to lower content of nitrogen oxides in the exhaust gas from the combustion engine in relation to the first engine mode; and a fourth engine mode corresponding to a higher exhaust gas temperature and lower content of nitrogen oxides in the exhaust gas from the combustion engine in relation to the first engine mode.

7. The method according to claim 5, wherein the engine mode comprises any one of the group of: fifth engine mode corresponding to a higher exhaust gas temperature in relation to the second engine mode; a sixth engine mode corresponding to lower content of nitrogen oxides in the exhaust gas from the combustion engine in relation to the third engine mode; and a seventh engine mode corresponding to a higher exhaust gas temperature and lower content of nitrogen oxides in the exhaust gas from the combustion engine in relation to the fourth engine mode.

8. The method according to claim 1, wherein the rate of injection of the additive corresponds to a rate of mass transfer, and wherein the rate of evaporation of the additive to the reducing agent corresponds to a rate of mass transfer.

9. The method according to claim 1, wherein the value of the coefficient (s) is between zero and 0.95.

10. The method according to claim 1, wherein the value of the coefficient (s) is between zero and 0.91.

11. A computer program product comprising computer program code stored on a non-transitory computer-readable medium, said computer program product used for counteracting solid deposits derived from an additive of selective catalytic reduction (SCR) after-treatment system of an exhaust gas of an exhaust gas stream from a combustion engine, wherein the selective catalytic reduction after-treatment system process comprises: injecting the additive in liquid form into the exhaust gas stream from the combustion engine; evaporating the additive to form a reducing agent, the reducing agent being added to the exhaust gas stream; and reducing nitrogen oxides of the exhaust gas stream in a reduction catalyst device through the use of the reducing agent added to the exhaust gas stream, said computer program code comprising computer instructions to cause one or more control units to perform the following operations:

defining an integrand to be the difference between a rate of injection of the additive and a rate of evaporation of the additive to the reducing agent multiplied by a coefficient (s), wherein the value of the coefficient (s) is between zero and one;

producing, by usage of an integral controller, an integral controller output which is proportional to the integral of the integrand with time; and requesting a countermeasure at least partly based on the integral controller output to counteract solid deposits derived from the additive.

12. A controller for counteracting solid deposits derived from an additive of selective catalytic reduction (SCR) after-treatment system of an exhaust gas of an exhaust gas stream from a combustion engine, wherein the selective catalytic reduction after-treatment system process comprises: injecting the additive in liquid form into the exhaust gas stream from the combustion engine, evaporating the additive to form a reducing agent, the reducing agent being added to the exhaust gas stream, and reducing nitrogen oxides of the exhaust gas stream in a reduction catalyst device through the use of the reducing agent added to the exhaust gas stream, wherein the controller is configured to:

define an integrand to be the difference between a rate of injection of the additive and a rate of evaporation of the additive to the reducing agent multiplied by a coefficient (s), wherein the value of the coefficient (s) is between zero and one;

produce, by usage of an integral controller, an integral controller output which is proportional to the integral of the integrand with time; and request a countermeasure at least partly based on the integral controller output to counteract solid deposits derived from the additive.

13. A selective catalytic reduction (SCR) exhaust gas after-treatment system comprising:

an inlet for receiving an exhaust gas stream from a combustion engine, a fluid injector for injecting an additive in liquid form into the exhaust gas stream which has entered the inlet, an evaporation arrangement for evaporating the additive to form a reducing agent, the reducing agent being added to the exhaust gas stream, a reduction catalyst device downstream of the evaporation arrangement, wherein the reduction catalyst device is configured to reduce nitrogen oxides of the exhaust gas stream through the use of the reducing agent added to the exhaust gas stream, and a control arrangement as claimed in claim 12.

14. A vehicle comprising a combustion engine producing an exhaust gas stream upon combustion in the combustion engine; and a selective catalytic reduction, (SCR) exhaust gas after-treatment system as claimed in claim 13 and downstream of the combustion engine.

* * * * *